United States Patent [19]
Seeger

[11] Patent Number: 5,834,679
[45] Date of Patent: Nov. 10, 1998

[54] METHODS OF PROVIDING AUTOIGNITION FOR AN AIRBAG INFLATOR

[75] Inventor: Donald Edwin Seeger, Lakeland, Fla.

[73] Assignee: Breed Automotive Technology, Inc., Lakeland, Fla.

[21] Appl. No.: 739,583

[22] Filed: Oct. 30, 1996

[51] Int. Cl.[6] .............................. C06D 5/06; C06B 41/02; B60R 21/28
[52] U.S. Cl. .......................... 102/288; 102/289; 280/741; 149/24
[58] Field of Search .................... 102/288, 289; 280/741; 149/24

[56] References Cited

U.S. PATENT DOCUMENTS

| | | | |
|---|---|---|---|
| 1,189,238 | 7/1916 | Calvet | 149/77 |
| 4,478,151 | 10/1984 | Vetter et al. | 102/481 |
| 4,561,675 | 12/1985 | Adams et al. | 280/674 |
| 4,566,921 | 1/1986 | Duguet | 149/22 |
| 4,690,063 | 9/1987 | Granier et al. | 102/530 |
| 4,858,951 | 8/1989 | Lenzen | 280/741 |
| 4,944,528 | 7/1990 | Nilsson et al. | 280/741 |
| 4,994,125 | 2/1991 | Mei | 149/22 |
| 5,019,192 | 5/1991 | Ramaswamy | 149/22 |
| 5,084,118 | 1/1992 | Poole | 149/22 |
| 5,100,170 | 3/1992 | Mihm et al. | 280/735 |
| 5,100,174 | 3/1992 | Jasken et al. | 280/741 |
| 5,114,179 | 5/1992 | Emery et al. | 280/741 |
| 5,167,426 | 12/1992 | Mihm et al. | 280/735 |
| 5,186,491 | 2/1993 | Yoshida et al. | 280/741 |
| 5,299,828 | 4/1994 | Nakajima et al. | 280/741 |
| 5,380,380 | 1/1995 | Poole et al. | 149/22 |
| 5,409,259 | 4/1995 | Cunningham et al. | 280/741 |
| 5,429,386 | 7/1995 | Mihm | 280/734 |
| 5,443,286 | 8/1995 | Cunningham et al. | 280/741 |
| 5,460,671 | 10/1995 | Khandhadia | 149/109.6 |
| 5,468,017 | 11/1995 | Kirsch et al. | 280/741 |
| 5,494,312 | 2/1996 | Rink | 280/737 |
| 5,501,152 | 3/1996 | Zeuner et al. | 102/292 |
| 5,671,946 | 9/1997 | Whalen et al. | 280/741 |

*Primary Examiner*—Peter A. Nelson
*Attorney, Agent, or Firm*—Lonnie R. Drayer; Donald O. Nickey

[57] ABSTRACT

Methods for producing a gas generator for a vehicle occupant restraint system with an autoignition means are disclosed. The autoignition composition used in the method preferably comprises $Pb(SCN)_2$ and chlorate oxidizer which undergo rapid autoignition at temperatures from approximately 190°–220° C. The inventive method provides for the use of aluminum for the gas generator housing. Through the method of this invention, autoignition compositions are safely manufactured by wet blending and are installed via automation in the interior of the inflator housing. When aluminum housings are used, a barrier material is used to prevent corrosion of the aluminum by the autoignition composition. Optionally, the dried autoignition material is coated with a protective substance to prevent water absorption and mechanical abrasion.

20 Claims, 3 Drawing Sheets

METHODS OF PROVIDING AUTOIGNITION FOR AN AIRBAG INFLATOR

FIELD OF THE INVENTION

The present invention relates generally to gas generators used to inflate devices such as vehicle occupant restraints (commonly known as airbags). More particularly, the present invention relates to methods of providing autoignition to gas generating materials in such gas generators.

BACKGROUND OF THE INVENTION

There are a variety of devices, such as thermostats, fuses and the like, which respond to an increase in temperature beyond a specific point. Two temperature responsive devices, which are employed in inflatable restraint systems, (hereinafter referred to as "airbags"), are igniters and thermal batteries. These temperature responsive devices are used to intentionally activate the airbag system when it is exposed to an unusually high temperature, such as in a fire.

The inflator for an airbag contains a gas generating material. The inflator also includes a standard igniter which ignites the gas generating material when the inflator is actuated. The inflator is actuated when a crash sensor senses that the vehicle has been involved in a crash of a predetermined magnitude.

The inflator may, on occasion, be subjected to an abnormally high temperature, for example if the vehicle is involved in a fire. In such a situation, the inflator housing may be weakened and/or the gas generating material becomes much more reactive than normal. To avoid explosive ignition of the gas generating material during a fire, the inflator should have an autoignition means. The autoignition means may be mechanical, electrical, or chemical and is typically located within the inflator. The autoignition means are required for the safe use of airbags because activation of the gas generates at high temperatures may result in the fragmentation of the housing of the inflating system. Fragmentation of the housing results from a combination of factors such as the development of abnormally high pressure from the burning generant, weakening of the housing at high temperatures and clogging of the vents where the gases are normally channeled into the airbag. This fragmentation constitutes a severe hazard and must be avoided.

As used herein and in the claims, the term "autoignition material" or "autoignition composition" means a material which will spontaneously ignite or combust at a temperature lower than that which would lead to the catastrophic destruction (explosion, fragmentation or rupture) of the airbag system. When the autoignition composition spontaneously ignites, the generated heat ignites the gas generating material. Thus, the gas generating material is ignited at a preselected temperature, which is higher than normally encountered ambient temperatures, but lower than the temperature at which the gas generating material itself would autoignite.

As used herein and in the claims, the term "autoignition system" means a combination of elements or components that includes an autoignition composition which ignites at a lower temperature than the temperature at which the gas generating material ignites. As will be described below, the system of the present invention, in one embodiment, uses an autoignition composition that is based on lead thiocyanate as the fuel and chlorates as the oxidizer. When an aluminum housing is used for the inflator, the lead thiocyanate based composition must not come into direct contact with the aluminum as undesired corrosion will occur. This is prevented through the use of a barrier material. Also, the autoignition composition globule can be coated with a protectant substance to reduce abrasion and absorption of water by the autoignition composition.

The inclusion of an autoignition material in an inflator assembly incurs increased expense as the autoignition material must be carefully prepared, handled and installed. Also, the temperature sensitivity of the material should not vary over the lifetime of the vehicle in which it is installed.

DISCUSSION OF THE PRIOR ART

U.S. Pat. No. 5,494,312 teaches an autoignition system for a fluid fueled inflator. At a predetermined temperature, a storage element opens and the fuel contacts an oxidant causing ignition. This patent teaches the use of separate chambers for the autoignition system, thus incurring additional cost and adding weight.

U.S. Pat No. 5,429,386 teaches a mechanical autoignition device for an inflator wherein the autoignition device employees a bimetal disk which deflects from concave to convex when the ambient temperature increases to a predetermined level. When the bimetal disk deflects into a convex shape, it moves a firing pin forcibly against a primer to actuate the prime, which in turn ignites the gas generating material. This approach adds additional weight to inflator assembly and considerable cost in the form of materials and labor.

U.S. Pat. No. 5,100,170 and U.S. Pat. No. 5,167,426 teach electrical autoignition devices for inflators wherein an autoignition sensing device is located outside of the inflator housing. A thermoelectric battery is adapted to initiate an electrical charge to set off the gas generating material when the temperature outside the inflator reaches a predetermined level of about 300°–400° F. (149°–205° C.). Allegedly this autoignition device is not affected by the design criteria and/or the thermal conductivity of the inflator housing, however, substantial cost and weight penalties are incurred.

U.S. Pat. No. 4,561,675 teaches an autoignition device contained within an aluminum inflator housing. This patent teaches that aluminum is too weak at the temperature that the gas generating material autoignites to contain the generated forces of such a reaction. The autoignition material autoignites at a temperature where the inflator housing possesses sufficient structural integrity to resist the forces generated when the gas generating material is ignited. This patent teaches that the autoignition material should be in a "container" which is in contact with an exterior wall of the inflator housing.

U.S. Pat. No. 5,100,174 and U.S. Pat. No. 5,114,179 teach an autoignition "packet" located within a hermetically sealed inflator housing. While the housings employed are commonly metal, preferably aluminum, it is understood that the present invention could be employed with a housing made of plastic, ceramic or any other suitable material. The packet is secured with a piece of adhesive tape inside a recess in the wall portion of the housing. While avoiding additional weight to the inflator, such a system would incur a substantial increase in manufacturing costs due to increased labor requirements.

U.S. Pat. No. 5,409,259 and U.S. Pat. No. 5,443,286 teach an inflator made of aluminum, with the autoignition material adjacent the igniter so that if the inflator is subjected to extreme heat, as in a fire, the autoignition material will autoignite and set off the gas generating material. A thin foil seal is placed across the opening in which the ignitor and the autoignition powder are mounted. The composition of the autoignition material is not disclosed in this patent.

U.S. Pat. No. 5,468,017 teaches the use of a metal autoignition packet in an inflator. The autoignition material is encased in metal, preferably thin aluminum. The preferred autoignition material is a stabilized nitrocellulosic composition, such as IMR 4895, which is available from E. I. du Pont de Nemours & Co., Inc. of Wilmington, Del. The autoignition material may also include an ignition enhancer such as $BKNO_3$.

Encasing an autoignition material in a metal or fabric enclosure is costly and could possibly impair the conduction of heat to the autoignition material. Attempts have been made to overcome these limitations.

U.S. Pat. No. 4,858,951 teaches small grains of an autoignition material physically mixed with the gas generating material, such that at a predetermined temperature, the autoignition material will autoignite and in turn ignite the gas generating material with which it is physically mixed. The preferred autoignition material is nitrocellulosic and other smokeless powders. The mixture may also contain $BKNO_3$ (boron potassium nitrate), $TiH_2$ (titanium hydride) and $KClO_4$ (potassium perchlorate).

U.S. Pat. No. 5,299,828 teaches a cylindrical inflator housing made of aluminum or aluminum alloy with an autoignition agent deposited substantially over the entire inner surface of the housing. Smokeless powder that ignites at about 150°–200° C. is disclosed as a suitable autoignition agent. The autoignition agent is not protected and is thus subject to abrasion and detachment from the inner surface of the cylindrical vessel.

U.S. Pat. No. 4,944,528 teaches an autoignition device which is a cup shaped member located in an aperture in the wall of the inflator housing. An unspecified autoignition material is placed in the cup. The opening of the cup faces the interior of the inflator housing and is sealed with an elastic material such as, for example, rubber, plastic or silicone rubber.

U.S. Pat. No. 5,186,491 discloses an inflation device wherein an autoignition material is located in a recess in the wall of the inflator housing and the recess is covered by a sealing member. The autoignition material ignites another ignitable material or the gas generating material inside the inflator housing.

Providing autoignition compositions for use in aluminum inflator housings has heretofore been problematic. U.S. Pat. No. 5,380,380 discloses autoigniting compositions containing a hydrazine salt of 3-nitro-1,2,4-triazole-5-one. This reference claims rapid autoignition at temperatures of approximately 150° C. thereby allowing the use of aluminum canisters or housings. The autoignition compositions of the patent are disclosed to be insensitive to shock or impact, safe to manufacture and handle, and are classified as class B materials.

Smokeless powders, such as du Pont 3031, are known autoignition materials. While such smokeless powders autoignite at a temperature of about 180° C., they are largely composed of nitrocellulose. One skilled in this art appreciates that nitrocellulose is not stable for long periods of time at high ambient temperatures and is thus unreliable as an autoignition composition component.

Autoignition compositions are disclosed in U.S. Pat. No. 5,084,118 which comprise 5-aminotetrazole, potassium or sodium chlorate and 2, 4-dinitrophenylhydrazine. While the compositions disclosed autoignite at approximately 177° C. they are also oversensitive to shock or impact. These compositions are also difficult and hazardous to manufacture, as they are classified as explosives and thus require special facilities for manufacturing and storage.

U.S. Pat. No. 5,460,671 discloses an autoignition composition that is prepared by wet mixing an oxidizer selected from the chlorates with a carbohydrate fuel. The autoignition composition is dried and then placed near the gas generating composition. This autoignition composition is taught to be useful in aluminum inflator housings.

U.S. Pat. No. 5,501,152 discloses an autoignition composition which is a mixture of nitrocellulose, carbon and an oxidizing agent. This composition is then pressed into tablets, pellets, or similar other lumpy bodies.

The prior art fails to suggest or disclose a method for providing autoignition for a gas generating device wherein the autoignition composition comprises lead thiocyanate $Pb(SCN)_2$ as the fuel, a chlorate such as potassium chlorate as the oxidizer, and optionally a binder and a flow agent/thickener. The prior art also fails to suggest or disclose a method wherein the autoignition composition is applied to the interior of an inflator housing as a paste or paint. Further, the prior art does not suggest use of a barrier substance for application to aluminum housings or the use of coatings over the autoignition material to prevent mechanical abrasion and the absorption of water.

BRIEF DESCRIPTION OF THE DRAWINGS

The features of the invention which are believed to be novel are set forth with particularity in the appended claims. The present invention, both as to its structure and manner of operation, may best be understood by referring to the following detailed description, taken in accordance with the accompanying drawings in which:

DETAILED DESCRIPTION OF THE INVENTION

Basic requirements for autoignition of a gas generator used in a vehicle occupant restraint system are that the autoignition composition be 1) thermally stable up to 110° C.; 2) not autoignite below a 150° C.; 3) autoignite rapidly at approximately 190°–220° C.; and 4) possess physical integrity to withstand abrasion and environmental changes. Many compositions presently known as autoignition compositions, such as nitrocellulose, are not effective after long-term aging. Vehicle occupant restraint inflator systems must pass aging requirements in order to assure reliable ignition despite exposure to a wide range of temperatures over the life of a vehicle.

One important aspect of this invention is the method in which the autoignition material is applied to the inside of the housing of the gas generating device. The autoignition material is deposited directly onto the surface of the housing or may be placed over a protective layer of material if the housing is made of aluminum and the autoignition material contains a corrosive agent. As will be described below, the preferred autoignition composition of the present invention should not be in direct contact with aluminum housings and therefore a protective coating is desired to separate the corrosive autoignition material from the aluminum. In another embodiment, the autoignition material is coated with a protective coating layer that reduces abrasion of the autoignition material by pellets of the gas generating composition and also prevents the absorption of water.

An advantage of the present method over the prior art resides in the ease and low cost of providing a gas generating device with an autoignition means. A further advantage of the present method resides in the use of an autoignition composition in the form of a paste or paint, that can be robotically deposited within the inflator housing which provides reliable and accurate autoignition of the gas generating composition.

Thus, the present invention relates to a method for providing autoignition to an apparatus for inflating an airbag, said method comprising: (1) providing a housing; (2) providing a gas generating material within said housing which, when ignited, generates gas for inflating the airbag; and (3) providing at least one autoignition globule adhering to the interior wall of said housing, said autoignition globule having an autoignition temperature below the autoignition temperature of said gas generating material and said autoignition globule comprising lead thiocyanate and a chlorate.

In one embodiment of the inventive method, the autoignition globule is applied to the interior wall of the inflator housing as a "dot" or "globule" of a paste or paint which may be water based, solvent based or based on a mixture of water and solvent. Further, the autoignition globule may comprise a binder and a flow agent/thickener. The autoignition composition uses chlorates as the oxidizer for the $Pb(SCN)_2$ fuel. The chlorates useful in the present invention include the known salts of chloric acid such as sodium chlorate, potassium chlorate, barium chlorate, calcium chlorate and the like.

There is also disclosed a method of making a gas generating device containing an autoignition system, the steps comprising: (a) forming a housing; (b) depositing at least one globule of a wet autoignition composition on the inside surface of said housing; (c) drying the wet autoignition globule; (d) placing a gas generating material within said housing; and (d) sealing said housing.

In a preferred embodiment of the invention, the housing is made of aluminum and the autoignition composition globule is applied as an aqueous based paste or paint. In addition, the autoignition composition, when used in an aluminum housing, is applied to a corrosion barrier such as an acrylate or silicone. Further, the autoignition globule may be coated with a material such as an acrylate or silicone to prevent abrasion and water absorption.

The dry weight of the autoignition material deposited within the housing can range from 10–500 mg. More preferably, each globule will typically weigh 50–200 mg and most preferably each globule will weigh 60–80 mg after drying. The weight of the globule as applied as a paint or paste will typically be from 20–40% higher than the recited dry weight ranges.

There is further disclosed a method of preventing, in a gas generation device for a vehicular passenger protection system, sufficient loss in mechanical strength of a gas generator housing prior to the ignition of the gas generating composition, said method comprising: (a) providing a housing; (b) providing at least one globule of an autoignition material adhering to the inside surface of said housing, said autoignition material comprising lead thiocyanate and a chlorate; said autoignition material having a temperature of ignition lower than the temperature of ignition of said gas generating composition; (c) providing a gas generating composition within said housing; and (d) causing the autoignition material to ignite by means of an external heat source, said ignition of said autoignition material igniting said gas generating composition prior to said housing losing sufficient mechanical strength to cause breakage thereof.

An autoignition composition useful in the present invention comprises: (a) lead thiocyanate; and (b) a chlorate. The autoignition composition may additionally comprise at least one material selected from binders and flow agents/thickeners.

In a more preferred embodiment, the autoignition composition is in the form of a paste or paint which is based upon aqueous solutions, solvent solutions or mixtures thereof. Most preferably, the paste or paint is water based wherein the binder is water soluble and the flow agent/thickener is hydrophilic. In an alternative embodiment, the autoignition composition uses a solvent such as ethanol, benzene, toluene, xylene, turpentine, methylene chloride and the like. One skilled in this art will appreciate that the solvent must not react with the lead thiocyanate, the chlorate, binder or flow agent/thickener prior to ignition, while also being able to solubilize or at least suspend these components.

In operation, the relatively low autoignition temperatures, i.e., approximately 190°–220° C., produced by the autoignition composition are maintained following long-term high temperature aging, for example, after 400 hours at 107° C. The autoignition compositions preferred in the method of the present invention ensure ignition reliability despite exposure to a wide range of temperatures over the life of the vehicle, which may be ten (10) or more years.

In operation, the autoignition composition will produce enough heat to raise a portion of the gas generating material to its ignition temperature. Since the autoignition composition is not packaged in a separate container, as in most of the prior art, the autoignition composition will effectively and reliably ignite the gas generant. In one embodiment of this invention, the autoignition globule may have placed near to it an additional ignition material. For example, small pellets or granules of a common ignition material, such as $BKNO_3$ can be utilized as a booster.

The housing for the airbag inflation device can be made of metal, steel, aluminum, aluminum alloys, stainless steel and the like. The preferred materials for the housing are aluminum and aluminum alloys as they provide a weight savings advantage and provide an ease of manufacture.

The autoignition globules which adhere to the inside wall of the inflator housing may be placed there by an automatic dispensing device or by hand with the aid of a brush, syringe or spoon. The size of the globule may vary over a wide range depending upon the size and configuration of the gas generating device. At least one globule must be placed within the housing, however numerous globules may be deposited within the housing. The dry weight of each globule should be at least 40 mg. Typically, the dry weight of the globule will be from 60 to about 150 mg. The weight of the globule as applied as a paint or paste will typically be from 20–40% higher than the recited dry weight.

In a most preferred embodiment of the inventive method, the autoignition material is placed on the interior wall of an aluminum housing as an aqueous paste or paint; the autoignition material comprises $Pb(SCN)_2$, a chlorate oxidizer, a water soluble binder and a hydrophilic flow agent/thickener; the autoignition composition is separated from the aluminum housing by a barrier material; the autoignition material is dried; and a coating is applied over the autoignition material.

Thus, in a preferred embodiment of this invention, there is disclosed a method of igniting a gas generating composition utilized in an inflator of a vehicle occupant restraint system comprising the steps of: (a) wet mixing lead thiocyanate with a chlorate oxidizer or mixtures thereof to form an autoignition composition paste or paint; (b) positioning the wet autoignition composition within the inflator proximate the gas generating composition; (c) drying the wet autoignition composition; and (d) causing the dry autoignition composition to reach an autoignition temperature whereupon the autoignition composition ignites the gas generating composition.

Those skilled in the art will understand how $Pb(SCN)_2$ and chlorate oxidizers can be combined to form an autoignition composition that ignites at temperatures from 190° to 220° C. Most preferably, the autoignition composition of the present invention will have an autoignition temperature of about 190° to 210° C. The weight ratio of $Pb(SCN)_2$ to chlorate oxidizer can be from 10:1 to 1:10. Preferably, the ratio is 2:1 to 1:2, with 1:1 being most preferred. On a percent weight basis, each of the $Pb(SCN)_2$ and the chlorate can range from 25–50%. As a paste or paint, the weight percent of reach can range from 25–40%.

The preferred components of the autoignition system of the present invention are lead thiocyanate ($Pb(SCN)_2$) and potassium chlorate ($KClO_3$) at a 1:1 weight ratio. $Pb(SCN)_2$ is incompatible with aluminum as it causes corrosion of the aluminum. Corrosion of the aluminum housing is highly undesirable and must be prevented. It has been found that an autoignition material containing $Pb(SCN)_2$ can be applied to an interior surface of an aluminum inflator housing without causing corrosion, provided a barrier is applied to the surface of the aluminum prior to the application of the autoignition composition.

The barrier material for use with aluminum housings can be any conventional paint or substance that will adhere to aluminum, be resistant to thermal degradation to the upper extreme of the required storage temperature (about 107° C. for a period of 400 hours minimum), be non-porous to the autoignition composition, suitable for automated dispensing, and allow for adherence of the autoignition composition. Representative of useful barrier materials are acrylates and silicones. Preferred barrier materials are Loctite® 3201 and 5290 Ultraviolet Curable Urethane Acrylate Resins sold by the Loctite Corporation of Rocky Hill, Conn. The same materials used for the barrier may also be used to coat the autoignition globule to prevent absorption of water into the globule and to provide protection from abrasion caused by pellets or granules of the gas generating composition.

It has been found useful to combine the $Pb(SCN)_2$ and chlorate oxidizer with binders to promote the formation of an adherent and cohesive globule. Known solvent based and water based binders such as hydrated lime ($Ca(OH)_2$), sodium silicate (NaSiO), calcium oxide (CaO), carboxymethlycellulose, natural rubber, synthetic rubber, synthetic resins and the like, can be used. Representative of the solvent based cements, resins or lacquers that are useful in the present invention as binders include nitrocellulose, ethylcellulose, polyamides, polyurethanes and epoxy compounds. The binder is preferably water soluble, stable to elevated temperature and provides an adhesive property to the $Pb(SCN)_2$ and oxidizer mixture. Representative of the water based binders that can be used in the present invention include starch, dextrins, gums, albumin, sodium silicate, sodium carboxymethylcellulose, lignin and polyvinyl alcohol (PVA). There is also a class of binders, useful in the invention, known as the water/solvent based binders. Representative of such materials are the resin esters, resorcinol formaldehyde, phenol formaldehyde, polyvinyl ethers and the like. Representative of preferred binders include Cerama-Bind 642, 643 and 644 sold by Aremco Products of Ossining, N.Y. which are water soluble inorganic silicates and the Elvanol® brand of polyvinyl alcohol's (PVA) sold by du Pont. Of the series of Elvanol® hydrolyzed polyvinyl alcohol binders, Elvanol® 52-22 is preferred. Also useful as binders in the present invention are a class of materials known as the sodium silicates. The ratio of silica ($SiO_2$) to sodium oxide ($Na_2O$) can be varied to meet the requirements of a wide range of end uses. A number of sodium silicates sold by Power Silicates, Inc. of Augusta, Ga. have been found to be useful in the present invention. Combinations of various binders are contemplated for use in the autoignition compositions.

The weight ratio of the binder material to the total of the $Pb(SCN)_2$ and the chlorate oxidizer can range from 1:100 to 1:1. A more preferred range is 1:50 to 1:1 with the most preferred ratio being 3:97. On a weight percent basis, the binder can range from 0–5% of the total composition. The binder material should not react with the other components of the autoignition composition prior to autoignition and should result in a smooth texture for the paste or paint. After drying, the autoignition composition with binders should be one continuous mass having a hard, smooth, tough surface. The most preferred binder is Cerama-Bind, Grade 642, which also is useful as a coating material for the globule.

The use of flow agents/thickeners are also beneficial in the autoignition composition of this invention, as they promote the formation of pastes or paints which can be applied to the interior of the inflator housing through automated dispensing devices. If the autoignition composition is solvent based, the flow agent/thickener should be hydrophobic and hydrophilic when water based. The use of materials such as hydrophilic silica to enhance the wetting characteristics of the final mix have been found to be preferred for aqueous based compositions. A preferred hydrophilic flow agent/thickener is Aerosil® 300 which is distributed by Degussa Corporation. Aerosil® 300 is a hydrophilic silica having a high specific surface area which provides an enhanced thickening and thixotropic effect. Other hydrophilic silicas that have been found useful in the present invention include Cab-O-Sil® M5 from Cabot Corporation and Zeotaix® 265 from the J. M. Huber Corporation. The weight ratio of the flow agent/thickener to the total of the $Pb(SCN)_2$ and chlorate can range from 1:100 to 1:1. A more preferred range is 1:50 to 1:1 with the most preferred ration being 3:97. On a weight percent basis of the total composition, the flow agent/thickener can range from 0–5%.

As used herein, the terms "slow hot plate test" or "slow heat ignition test" means a test wherein samples of the autoignition material are placed in an aluminum pan and dried. The pan, with samples, is then placed on a cool hot plate and the hot plate is then turned on and set on "high". The hot plate has an attached thermocouple to record temperatures. The temperature at zero time is noted and then recorded every five (5) minutes as the temperature rises. While heating the test samples, they were observed for discoloration, exudation, burning, explosion and the like.

Typically, the rate of heating was about 5°–10° C./minute. This test is a very rigorous test for autoignition compositions since, under such conditions, many compositions slowly decompose under the increasing temperatures and thereby fail to ignite at the desired temperature, for example, 190°–220° C.

EXAMPLE I

The preferred autoignition compositions useful in the method of this invention comprise a fuel, an oxidizer, a water soluble binder and a hydrophilic flow agent/thickener. The mixing of the compositions can be accomplished through the use of known equipment in the art. Lead thiocyanate, potassium chlorate and Aerosil® 300 (hydrophilic silica) were added to a dry blender with velostat chips and mixed for 30 minutes. An aqueous solution of Elvanol® 52-22 (PVA binder) was then added to the dry mix and blended with a wooded spatula until a smooth paste resulted. Additional water may be added to result in a desired consistency. The autoignition paste was then applied to an aluminum pan as a small globule and dried in an oven at 95° C. for about 1 hour. The drying of the autoignition globules may, in general, be conducted from room temperature up to about 110° C.

The composition of the autoignition paste and the dried autoignition globule are set forth in Table 1.

TABLE 1

| Material | % by Weight | |
|---|---|---|
|  | Wet (paste) | Dry |
| Lead thiocyanate | 32.8 | 48.3 |
| Potassium chlorate | 32.8 | 48.3 |
| Aerosil 300 | 0.4 | 0.6 |
| Elvanol 52-22 (binder) | 1.9 | 2.8 |
| Water | 32.1 | — |

The globule of the dried autoignition material in the aluminum test pan (0.9 mm thick, 6.35 cm in diameter and 1.25 cm deep) was then subjected to the slow heat ignition test. The temperature was increased at a rate of 5°–10° C./minute. The temperature at which the composition autoignited was determined to be between 190°–200° C.

EXAMPLE II

In this example, the autoignition composition was prepared and then placed within a steel inflator or housing. The potassium chlorate, lead thiocyanate and Aerosil® 300 were blended in a dry state and then a 7.73% by weight water solution of Elvanol 52-22 was added to prepare the paste. The following Table 2 sets forth the components of the autoignition composition on a dry weight basis and as the paste.

TABLE 2

| MATERIAL | WT. IN GRAMS | WET % BY WT. | DRY WT. GMS. | DRY % BY WT. |
|---|---|---|---|---|
| Potassium chlorate | 0.9951 | 35.5 | .9951 | 48.3 |
| Lead thiocyanate | 0.9951 | 35.5 | 0.9951 | 48.3 |
| Aerosil ® 300 | 0.0100 | 0.4 | 0.0100 | 0.5 |
| Elvanol 52-22 solution | 0.8036 | — | — | — |

TABLE 2-continued

| MATERIAL | WT. IN GRAMS | WET % BY WT. | DRY WT. GMS. | DRY % BY WT. |
|---|---|---|---|---|
| $H_2O$ from solution | 0.7415 | 26.5 | — | — |
| Elvanol 52-22 | 0.0621 | 2.2 | 0.0621 | 3.0 |
| TOTAL | 2.8041 | 100.0 | 2.0623 | 100.0 |

Charges of the autoignition composition were applied to the inflator housing by "spooning" the paste into the interior of the housings. The following Table 3 sets forth the weight of each charge in the housings after the charge was dried.

TABLE 3

| Housing Number | Charge, mg |
|---|---|
| 1 | 167.0 |
| 2 | 179.3 |
| 3 | 152.3 |
| 4 | 123.5 |
| 5 | 111.6 |
| 6 | 127.4 |
| 7 | 224.2 |
| 8 | 126.2 |
| 9 | 163.6 |
| 10 | 111.5 |

The housings were then subjected to the slow heat test. All of the samples autoignited at a temperature of from 190°–220° C.

EXAMPLE III

Use of $NaClO_3$

The use of sodium chlorate ($NaClO_3$) as a replacement for $KClO_3$ used in Example I was evaluated. Normally $NaClO_3$ is not used where $KClO_3$ is available because $NaClO_3$ absorbs atmospheric moisture more readily than $KClO_3$. However, in a water based autoignition composition that can be applied wet to an inflator housing, $NaClO_3$ is useful because it is very soluble in water.

Approximately 62.9 grams of $NaClO_3$ was placed in a 125 ml flask with about 75 ml of deionized water. The flask was heated and agitated to aid in solubilizing the $NaClO_3$. The resulting solution had a concentration of 0.493 g $NaClO_3$/g of solution. A dry mix of $Ca(OH)_2$, (binder), $Pb(SCN)_2$ and Aerosil® 300 (hydrophilic flow/thickening agent) was prepared and sufficient $NaClO_3$ solution was added to completely wet the dry mix. The composition was applied to an aluminum pan and air dried for approximately 72 hours. The content of the composition on a dry weight basis is set forth in Table 4.

TABLE 4

| MATERIAL | % DRY WEIGHT |
|---|---|
| $Pb(SCN)_2$ | 34.8 |
| $NaClO_3$ | 45.5 |
| $Ca(OH)_2$ | 17.9 |
| AEROSIL ® 300 | 1.8 |

Four samples of this composition were evaluated using the "slow hot plate test". The rate of heating was about 6.7° C./minute. The autoignition temperature of the four samples was about 238° C. From this experiment, it was concluded that $NaClO_3$ may be employed in the autoignition composition of this invention. The autoignition composition using NaClO₃ as the oxidizer formed a relatively sensitive charge.

EXAMPLE IV

In the commercial production of airbag inflation devices, the factors of cost, weight and reliability are critical. One aspect of the present invention resides in the mechanical application of the autoignition composition, the barrier material and the coating to the inside of the inflator housing. The use of such mechanical applicators reduces labor costs and allows for the consistent application of a given amount of the autoignition composition which results in reliable and predictable ignition.

Representative of equipment useful for the mechanical application of the fluid autoignition composition, the barrier material and the coating to the inside of the inflator housing is Model EFD100XL, Fluid Dispensing System manufactured by EFD, Inc., of East Providence, R.I. An illustration of this device is presented in FIG. 1. In brief, this device uses air pressure to control the dispensing of fluids or pastes from a syringe. Devices like the EFD100XL can make very consistent dots or globules of the material to be dispensed and are readily adapted to automated systems.

An autoignition composition similar to that set forth in Example I was prepared except that various amounts of water were used to determine the optimum water content for the automatic dispensing device. One skilled in this art will appreciate that the water content of the paste will vary depending upon the device, the size of the opening of the syringe, the pressure utilized and the amount material to be deposited. For the above recited device, a syringe opening of 0.24 cm (0.095 inches), a pressure of 137.9 kPa (20 psi), vacuum of 103.4 kPa (15 psi) and a pulse of 0.01 seconds results in uniform, self-leveling globules when the water content was about 27% by weight.

Two formulations containing Ca(OH)₂ as the binder were prepared according to the formulations in Table 5.

TABLE 5

| | Weight % | |
|---|---|---|
| Material | Formula IV A | Formula IV B |
| Ca(OH)₂ | 20 | 30 |
| Pb(SCN)₂ | 40 | 35 |
| KClO₃ | 40 | 35 |

First the non-reactive combination of Ca(OH)₂ and Pb(SCN)₂ was produced by dry blending these materials together with velostat chips to assure the breakdown of the agglomerates of both of these materials. After processing this mix, the chips were removed, the KClO₃ was added and the resultant combination was further blended. A quantity of tap water was added to the blend to result in a plastic putty like consistency that could be used for dispensing with an air pressurized syringe. The autoignition compositions were deposited onto aluminum pans.

In slow hot plate tests, autoignition occurred at 220° C. to 270° C. and did not seem to be dependent upon whether 20 or 30 weight % of Ca(OH)₂ was used. Ca(OH)₂ appeared to be relatively non-reactive with the aluminum, however severe corrosive reaction of the aluminum by the Pb(SCN)₂ was not abated by the use Ca(OH)₂ as the binding materials.

EXAMPLE V

This experiment was conducted to investigate the deposition of autoignition materials directly on an interior surface of a steel housing which will contain a gas generating material. The compositions evaluated are described in Table 6. Water slurries of these compositions were prepared, applied to steel plates, dried and then subjected to slow hot plate tests.

TABLE 6

| | Weight % | | | | |
|---|---|---|---|---|---|
| | Formula VA | Formula VB | Formula VC | Formula VD | Formula VE |
| Pb(SCN)₂ | 44 | 46.7 | 49.7 | 49.7 | 49.7 |
| KClO₃ | 44 | 46.7 | 49.7 | 49.7 | 49.7 |
| Ca(OH)₂ | 10 | — | — | — | — |
| Aerosil 300 | 2 | — | 0.6 | 0.6 | 0.6 |
| Sodium Silicate | — | 6.6 | — | — | — |
| Elvanol 52-22 | — | — | 5.1* | 3* | — |

*added to the dry ingredients via an aqueous solution

The results of the slow hot plate test of Formula VA are presented in Table 7. The rate of heating was about 5.5° C./min.

TABLE 7

| Plate No. | Charge Wt. (gm) | Time (min:sec) | Temp. (°C.) |
|---|---|---|---|
| 1 | 0.1211 | 30:16 | 187 |
| 2 | 0.1774 | 30:16 | 187 |
| 3 | 0.1324 | 30:16 | 187 |

The results of the slow hot plate tests of Formula VB are presented in Table 8. The rate of hearing was about 5.5° C./min. While the charge functioned, it did not propagate completely. It appears that greater than 5% by weight sodium silicate inhibits rapid propagation.

TABLE 8

| Plate No. | Charge Wt. (gm) | Time (min:sec) | Temp. (°C.) |
|---|---|---|---|
| 1 | 0.1941 | 27:07 | 173 |

The results of the slow hot plate tests of Formula VC are presented in Table 9. The rate of heating was about 5.0° C./min. All of the charges propagated completely when initiated. The charges appeared to have both good physical characteristics and to be well bonded to the steel plate.

TABLE 9

| Plate No. | Charge Wt. (gm) | Time (min:sec) | Temp. (°C.) |
|---|---|---|---|
| 1 | 0.0324 | 33:42 | 195 |
| 2 | 0.0563 | 35:03 | 291 |
| 3 | 0.0486 | 42:58 | 232 |

The results of the slow hot plate tests of Formula VD are presented in Table 10. The rate of heating was about 6.1° C./min.

TABLE 10

| Plate No. | Charge Wt. (gm) | Time (min:sec) | Temp. (°C.) |
|---|---|---|---|
| 1 | 0.1033 | 26:44 | 191 |
| 2 | 0.0179 | 29:19 | 204 |
| 3 | 0.0233 | 29:07 | 205 |

The results of the slow hot plate tests of Formula VE are presented in Table 11. The rate of heating was about 6.1° C./min.

TABLE 11

| Plate No. | Charge Wt. (gm) | Time (min:sec) | Temp. (°C.) |
|---|---|---|---|
| 1 | 0.0241 | 28:15 | 202 |
| 2 | 0.0332 | 27:13 | 200 |
| 3 | 0.0179 | no fire | |

It was concluded that a formulation containing about 50/50 $Pb(SCN)_2/KClO_3$, by weight, appears capable of functioning as an autoignition charge activated at about 200° C. when applied to metal in liquid form with or without binders and/or flow agent/thickeners.

The formulations containing $Ca(OH)_2$ (Formula VA and sodium silicate 20 (Formula VB) as binders did not function consistently. Of the materials tested, the polyvinyl alcohols appear to have the best binding characteristics for the $Pb(SCN)_2$ based charges.

EXAMPLE VI

Charges of the autoignition material of Formula VD of Example V, in the form of a water-based slurry, were applied to an inside surface of three steel housings using an artist's paint brush. After the charges were dry, several drops of Loctite 5290 were applied over each charge so that the entire charge was coated. The purpose of this coating was to protect the autoignition charges from abrasion by the gas generating material and retard absorption of water. This coating material has a low viscosity, so the coating was very thin. Three of these units were subjected to bonfire conditions, and all three autoignited.

EXAMPLE VII

The use of a fluid dispensing system to apply the autoignition material to a surface was further investigated. The equipment used was a Model EFD 100XL Fluid Dispensing System previously described.

Initial dispensing trials were conducted using the nonreactive formulation presented in Table 12. The dry mix was prepared and water was added to render the mix a fluid which was about 27% by weight water. The slurry mix was placed in a 3 cc plastic syringe with a plastic plunger, and the syringe was fastened to the dispensing system. No needle was used. The opening in the syringe through which the slurry was dispensed was about 0.24 cm (0.095 inches) in diameter. At 27% by weight water, the dispensing system produced uniform globules.

TABLE 12

| | weight (gms) | % by weight wet | % by weight dry |
|---|---|---|---|
| $Pb(SCN)_2$ | 3.0068 | 70.2 | 97.0 |
| Aerosil 300 | 0.0936 | 2.2 | 3.0 |
| $H_2O$ | 1.1815 | 27.6 | — |

A slurry mix was then prepared using the reactive dry blended premix composition (49.7% $Pb(SCN)_2$/49.7% $KClO_3$/0.6% Aerosil 300) with an aqueous solution containing 3% PVA 52-22, by weight. The weights of materials used in the preparation of this slurry are presented in Table 13.

TABLE 13

| | weight (gms) | % by weight wet | % by weight dry |
|---|---|---|---|
| Premix | 3.9997 | 76.3 | 97.0 |
| PVA 52-22 | 0.1236 | 2.4 | 3.0 |
| $H_2O$ | 1.1179 | 21.3 | — |

The water content of this reactive slurry was lower than that used in the nonreactive trial. This was done to determine the lower limit of the water content required for good dispensing of the slurry. This reactive slurry could not be extruded from the dispensing system until the dispensing pressure was increased to about 207–241 kPa (30–35 psi). The slurry was too dry to be self leveling, and it was concluded that about 27% water content was more suitable for automated dispensing from this particular device. The charges were subjected to slow hot plate tests and autoignited at temperatures of 189° to 206° C.

EXAMPLE VIII

This experiment is designed to investigate the use of an automated dispensing device to install the autoignition system of the present invention. An autoignition composition according to Example II is prepared and placed in the dispensing device described in Example IV. The autoignition paste contains about 27% by weight water. The settings of the device result in placement of about 100 mg of wet autoignition composition paste per globule.

A second dispensing device is prepared that contains the acrylate resin known as Loctite® 5290. The settings of the device result in placement of about 50 mg of the resin to an aluminum inflator housing or the dried globule. The barrier layer is about 0.5–0.75 cm. in diameter. Aluminum inflator housings are provided and the interiors of the housing are free of dirt and grease to ensure good adhesion between the aluminum, metal and the barrier. The resin dispensing device applies the barrier layer. The barrier is cured (dried) by application of UV light. The autoignition composition dispensing device then deposits a globule of the autoignition composition over the barrier layer. Care is taken to ensure that the globule is not outside the barrier layer. The globule is dried at room temperature or in ovens at up to 100° C. The resin dispensing device then applies a coating of the resin over the dried globule. Sufficient resin is applied to completely cover the globule. The coating is then cured or dried through application of UV light. The aluminum housings are subjected to the slow heat test and all samples will ignite at 190°–210° C.

In addition, experiments using from 2 to 5 autoignition systems (barrier layer/autoignition globule/coating layer) in accordance with the invention are placed inside an aluminum housing. Bonfire tests will indicate that the systems all ignited.

EXAMPLE IX

Various levels of a $Ca(OH)_2$ binder were evaluated in this experiment. A dry pre-mix of 47% $Pb(SCN)_2$ and 53% $KClO_3$ by weight was prepared. A dry blend of the pre-mix and $Ca(OH)_2$ was prepared wherein either 20% or 30% by weight of the final composition was $Ca(OH)_2$. The compositions were mixed with water to result in a composition having a pasty consistency. Samples were placed in a test pan and then air dried. The weight % of water ranged from 23.5 to 37.5%. After 24 hours of air drying all charges were firmly attached to the aluminum pan, however, cracks extending completely through the charge or globule to the bottom were noted. Some pitting and perforation (corrosion) of the aluminum pans was also noted. The weights of the four samples with 20% $Ca(OH)_2$ ranged from 0.1979 g to 0.5795 g. The diameter of the charges ranged from about 1.7 cm to 2.5 cm while the thickness of the charges ranged from about 0.05 cm to about 0.18 cm. After air drying for about an additional 96 hours, the samples were tested in the slow heat test. The temperature rise was about 7.4° C./minute. All samples autoignited at from 218°–232° C.

An additional sample of the 20% $Ca(OH)_2$ composition and the 30% $Ca(OH)_2$ composition were coated with a solution of Cerama-Bond 642 (sodium silicate). The sodium silicate solution was brushed onto the globule or charge and air dried. These samples were then evaluated in the slow heat test. The rate of temperature increase was about 7.1° C./minute. The 20% $Ca(OH)_2$ exploded at 246° C. while the 30% sample burned rapidly at 248°.

EXAMPLE X

Two Binders

To the 20% $Ca(OH)_2$ dry mixture prepared in Example VIII was added a water solution of 1 part by volume Cerama-Bond 642 to 3 parts water. Four samples were prepared, air dried and tested in the slow heat test. The temperature rise was about 7.2° C./minute. All four samples ignited at 248° C. The experiment indicates that mixtures of binders are useful in the present invention.

EXAMPLE XI

Comparative

The use of sulfur as a fuel for a autoignition composition that would adhere to a metal inflator housing was investigated. The stoichiometric weight ratio of sulfur to $NaClO_3$ is 31 to 69. A saturated aqueous solution of $NaClO_3$ (0.493 g of $NaClO_3$ per g of solution) was placed in an aluminum pan. 0.31 g of sulfur was then added and the mixture stirred with a wooden spatula. Globules of the resulting mixture were then placed in four aluminum pans and dried. The charge weights ranged from 0.1124 g to 0.3822 g. Slow heat tests were conducted with a temperature rise of 6.72° C./minute. No autoignition occurred with any charge up to a temperature of 200° C.

EXAMPLE XII

Comparative

In this experiment, a water mixed slurry of sulfur, $Ca(OH)_2$ and Aerosil® 300 was combined with a $NaClO_3$ a saturated solution. Dried globules of this mix autoignited at temperatures as low as 138° C. in the slow heat teat. In other testing, mixtures of sulfur, $NaClO_3$, $Ca(OH)_2$ and sodium silicate demonstrated autoignition at drying temperatures of 95° C. It was also determined that sulfur is rapidly lost through oxidation at temperatures above 107° C. From Example XI and this example, it is clear that sulfur is not an appropriate fuel for an autoignition composition.

DESCRIPTION OF THE DRAWINGS

Figure 1:
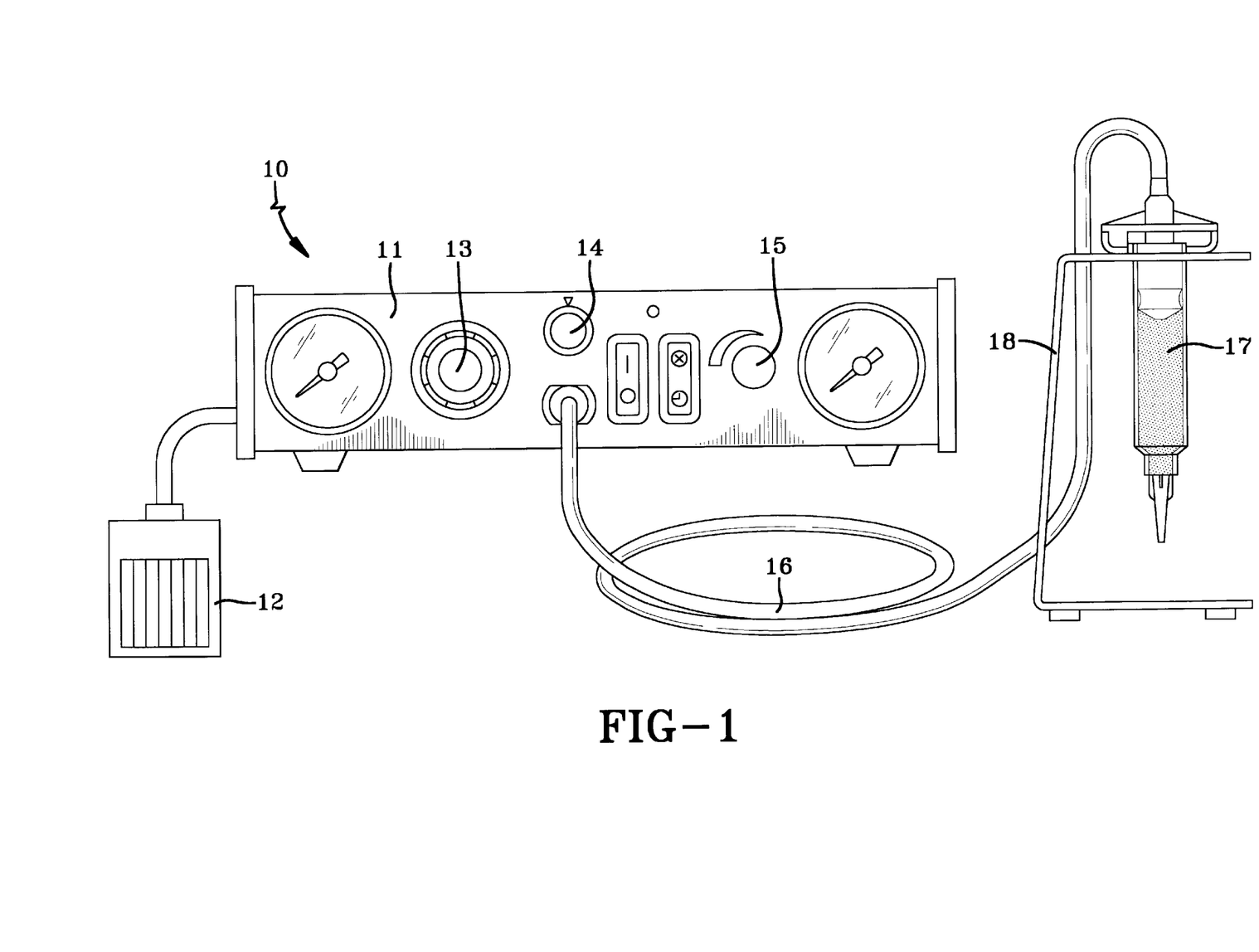
FIG. 1 is a diagrammatic representation of an exemplary fluid dispensing apparatus which may be used in the method of the present invention.

Referring to FIG. 1, there is shown an exemplary air powered fluid dispensing device 10 which may be used in the method of the present invention. The device 10 may also be used to apply the barrier material 41 of FIG. 1 for the autoignition material and may also be used to apply the coating 43 of FIG. 5. In general, the fluid dispensing device 10 consists of a control unit 11, a foot pedal 12, an air hose 16 and a no-drip syringe system 17. The control unit 11 contains means for an adjustable output air regulator 13 which provides control of fluid flow, means to adjust dispense time 14 and means to control barrel (syringe) vacuum 15 to facilitate the dispensing of low viscosity liquids. An air hose 16 connects the control unit 11 to the no-drip syringe system 17. Syringe system 17 is held in a storage stand 18. The foot pedal 12 is connected to the control unit 11 to provide manual fluid flow control.

Figure 2:
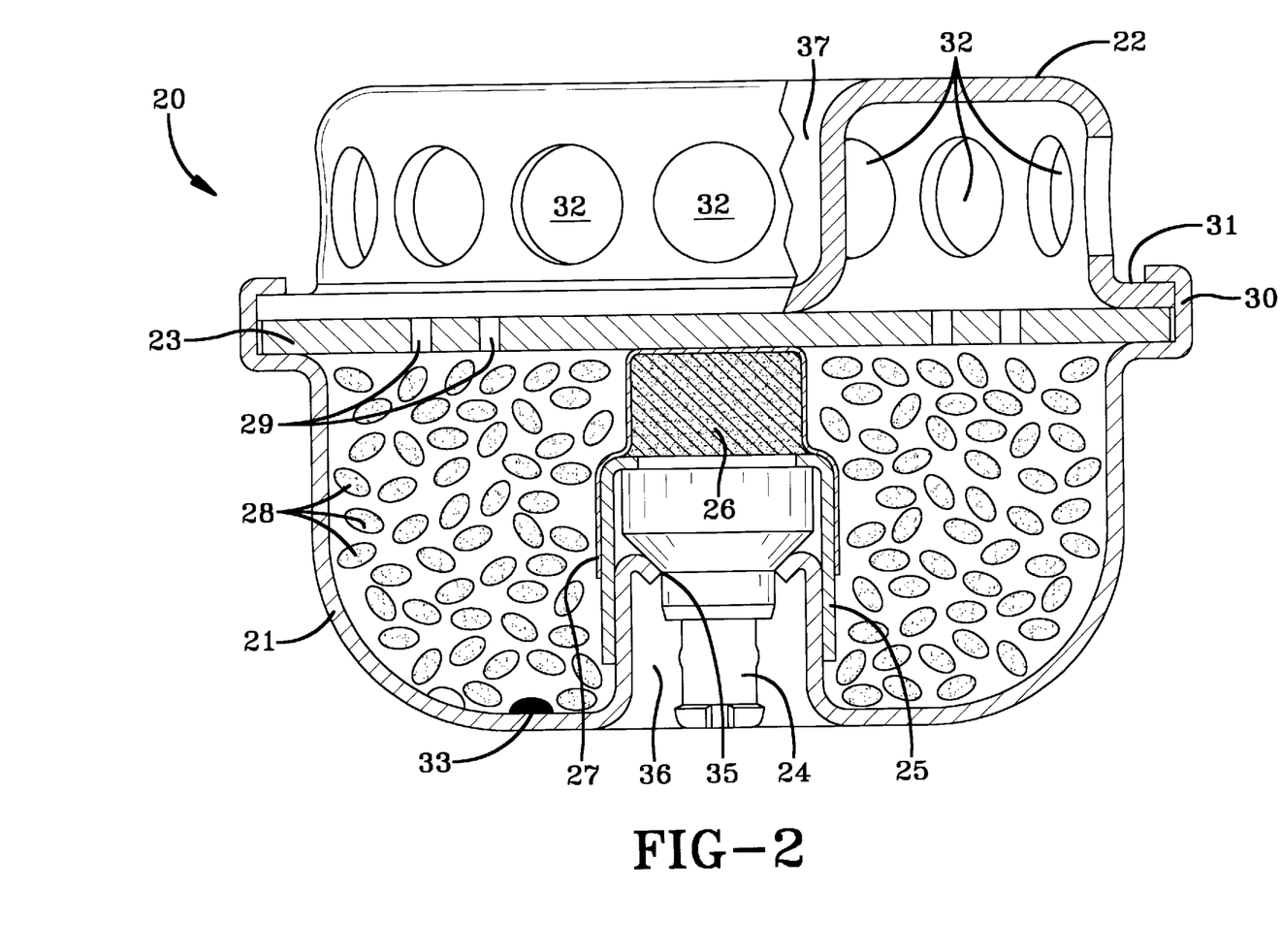
FIG. 2 is a side view, partially in section, of an airbag inflating device to which the method of the present invention may be applied.

Referring to FIG. 2, there is shown an exemplary gas generating device 20 which may be used with the method of the present invention. This exemplary gas generating device may be employed as a component of a vehicle occupant restraint system of the type which deploys an airbag to protect a vehicle occupant in the event of a crash. When a crash sensor (not shown) detects a crash of a preselected severity it closes an electrical circuit or initiates a firing signal which activates a squib 24 which ignites a booster composition 26, which in turn ignites the gas generating composition 28 located in the housing 21. As used herein a squib is understood to be an electrical device having two electrodes insulated from one another and connected by a bridge wire (not shown). The bridge wire is preferably embedded in one or more layers of pyrotechnic compositions designed to give a flash (heat) of sufficient intensity to ignite the booster composition.

The exemplary gas generating device 20 comprises a first housing member 21, a second housing member 22, and a choke plate 23 interposed between the first and second housing members. The first housing member 21 has a flange 30 which is bent over to secure the choke plate and the second housing member to the first housing member. The housing members and choke plate may be formed of any suitable material, preferably aluminum or steel.

The first housing member 21 is cup shaped with a recess 36 extending inwardly from the closed end thereof. As used herein terms such as "inward", "inwardly" and so forth are understood to refer to directions going toward the interior of the gas generating device, and terms such as "outward" and "outwardly" are understood to refer to directions going toward the exterior of the gas generating device. The recess 36 in the closed end of the first housing member 21 has an aperture 35 therethrough to accommodate the assembly of a squib 24 with the first housing member. The squib is secured in place by a collar 25 which is telescoped over the inside surface of the closed end of the first housing member. A cup 27 containing a booster composition 26 is telescoped over the outside surface of the collar 25. The gas generating composition 28 is located in the first housing member 21.

In accordance with the present invention an autoignition composition globule 33 is disposed within the housing 21 in close proximity to the gas generating composition 28. As used herein and in the claims an autoignition composition is a material which will spontaneously ignite at a lower temperature than the temperature at which the gas generating 28 material ignites. The auto-ignition material is a composition which will spontaneously ignite at a preselected temperature, and thereby ignite the gas generating composition.

A choke plate 23 having a plurality of apertures 29 therethrough is located at the open end of the first housing member 21. A second housing member 22 is located at the open end of the first housing member 21 with the choke plate 23 located between the first and second housing members. The second housing member 22 has a plurality of apertures 32 therethrough. The second housing member is cup shaped. A flange 31 is located at the open end of the second housing member. In this exemplary device the choke plate 23 and the flange 31 of the second housing member are secured to the first housing member by a flange 30 of the first housing member 21 which is bent over inwardly. A recess in the center of the annular ring 37 of the second housing member 22 has a plurality of apertures 32 therethrough.

Figure 3:
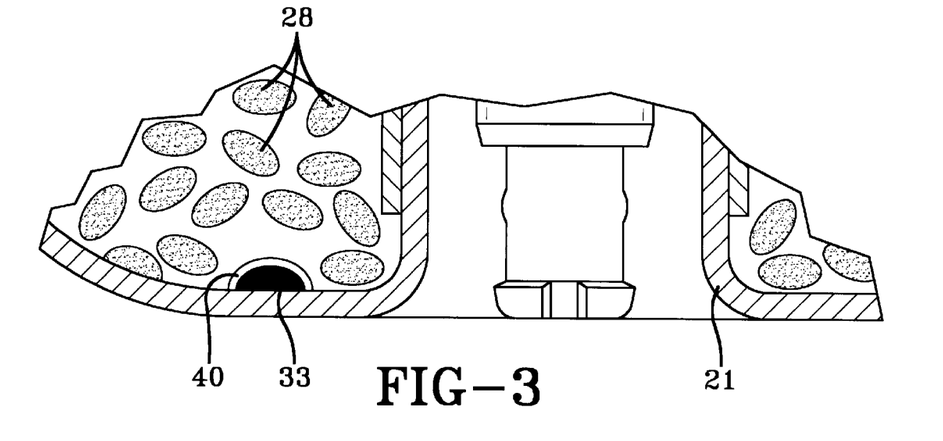
FIG. 3 is an enlarged fragmentary view of an alternative embodiment of the autoignition system resulting from the method of the present invention.

Referring next to FIG. 3 there is shown an enlarged fragmentary view of an alternative embodiment of the autoignition system of the present invention. In this embodiment a coating 40 of material such as an acrylate or silicon overlies the autoignition material 33 to protect it from being abraded by the gas generating material 28.

Figure 4:
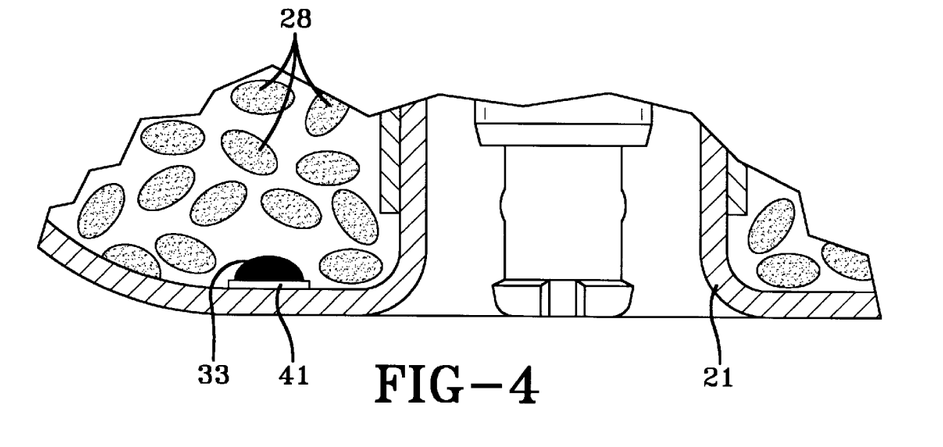
FIG. 4 is an enlarged fragmentary view of another alternative embodiment of the autoignition system provided as a result of the method of the present invention.

Referring next to FIG. 4 there is shown an enlarged fragmentary view of an alternative embodiment of the present invention. In this embodiment a barrier layer 41 of material such as an acrylate or silicone is disposed between the autoignition composition 33 and the aluminum housing 21 to protect the housing from being corroded by the Pb(SCN)$_2$ in the autoignition composition.

Figure 5:
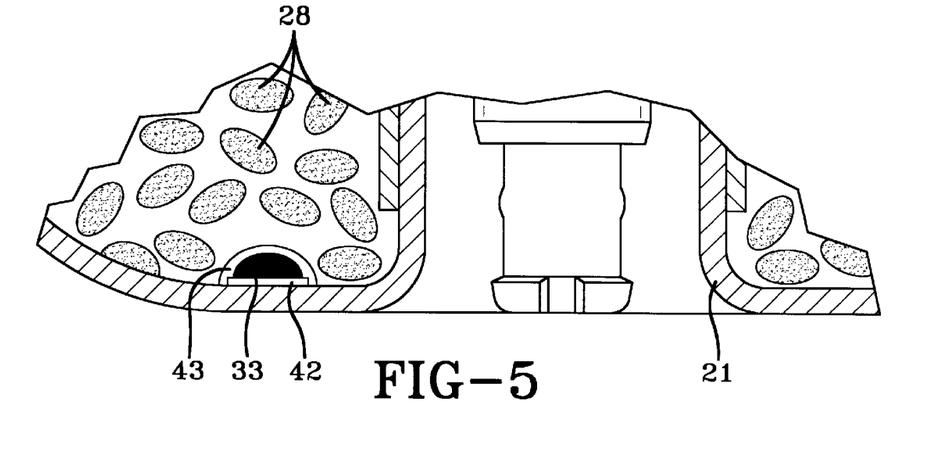
FIG. 5 is an enlarged fragmentary view of another alternative embodiment of the autoignition system as provided by the method of the present invention.

Referring next to FIG. 5 there is shown an enlarged fragmentary view of another alternative embodiment of the autoignition system of the present invention. In this embodiment a barrier layer 42 of an acrylate or silicone is disposed between the autoignition composition and the housing 21 to protect the housing from being corroded by the Pb(SCN)$_2$ in the autoignition composition and a coating 43 of an acrylate or silicone the autoignition composition 33 to protect it from being abraded by the gas generating material 28 and to prevent absorption of water.

INDUSTRIAL APPLICABILITY

The automotive industry and the consuming public desire to enhance the safety of passengers in motor vehicles. The use of airbags has become widespread and the automotive industry is constantly searching for new technology to improve the reliability and safety of these devices while also reducing costs to manufacture and reduce weight. The present invention solves several of industry needs through a novel method of installing an autoignition system into a gas generating device. Further, the use of the system will result in substantial labor savings and reduced weight of the inflator assembly.

While specific embodiments of the invention have been shown and described in detail to illustrate the application of the principles of the invention, it will be understood that the invention may be embodied otherwise without departing from such principles.

I claim:

1. A method of igniting a gas generating composition utilized in an inflator of a vehicle occupant restraint system comprising the steps of:
    (a) wet mixing lead thiocyanate with a chlorate oxidizer to form a wet autoignition composition paste or paint wherein lead thiocyanate is 25–40% by weight of the autoignition composition;
    (b) positioning the wet autoignition composition in the form of at least one globule within the inflator proximate the gas generating composition
    (c) drying the wet autoignition composition; and
    (d) causing the dry autoignition composition to reach an autoignition temperature at of about 190° to about 220° C. whereupon the autoignition composition ignites the gas generating composition.

2. The method of claim 1 wherein the inflator comprises a housing having at least a portion thereof formed of aluminum.

3. The method of claim 1 wherein said oxidizer is selected from the group consisting of sodium chlorate, potassium chlorate and barium chlorate or mixtures thereof.

4. The method of claim 1 wherein the autoignition composition additionally comprises at least one element selected from water soluble binders and hydrophilic flow agent/thickeners.

5. The method of claim 1 wherein the wet mixing is in the presence of water.

6. The method of claim 4 wherein the wet autoignition composition comprises based on percent by weight:

| | |
|---|---|
| lead thiocyanate | 25–40% |
| potassium chlorate | 25–40% |
| water soluble binder | 0–5% |
| hydrophilic flow agent/thickener | 0–5% |
| water | 20–40%. |

7. The method according to claim 1 wherein the autoignition composition additionally comprises at least one material selected from binders and flow agents/thickeners.

8. The method according to claim 3 wherein said oxidizer is selected from the group consisting of sodium chlorate, potassium chlorate and mixtures thereof.

9. The method according to claim 7 wherein the autoignition composition additionally comprises at least one element selected from water soluble binders and hydrophilic flow agent/thickeners.

10. The method according to claim 9 wherein said autoignition composition comprises, based on percent dry weight:

| | |
|---|---|
| lead thiocyanate | 25–50% |
| potassium chlorate | 25–50% |
| water soluble binder | 0–5% |
| hydrophilic flow agent/thickener | 0–5%. |

11. A method for providing autoignition to an apparatus for inflating an airbag, said method comprising:
    (a) providing a housing;
    (b) providing a gas generating material within said housing which, when ignited, generates a gas for inflating the airbag; and
    (c) providing at least one autoignition globule adhering to the interior wall of said housing, said autoignition globule having an autoignition temperature below the autoignition temperature of said gas generating material and said autoignition globule comprising on a dry weight basis, 25–50% lead thiocyanate and 25–50% chlorate and autoigniting at about 190° to about 220° C.

12. The method according to claim 11 wherein said apparatus additionally comprises at least one element selected from:
    (1) a barrier material between the interior wall of said housing and said autoignition globule; and
    (2) a coating material covering said autoignition globule.

13. A method according to claim 12 wherein the barrier material and the coating material are selected from acrylates and silicones.

14. A method according to claim 11 wherein said autoignition globule additionally comprises at least one element selected from the group consisting of water soluble binders and hydrophilic flow agents/thickeners.

15. A method according to claim 14 wherein said autoignition globule comprises, based on dry weight:

| | |
|---|---|
| lead thiocyanate | 30–50% |
| potassium chlorate | 30–50% |
| water soluble binder | 0–5% |
| hydrophilic flow agent/thickener | 0–5%. |

16. A method for the production of a gas generating device containing ignitable gas generating material, the steps comprising:
(a) forming a housing;
(b) depositing at least one globule of a wet autoignition composition comprising 25–40% by weight lead thiocyanate on the inside surface of said housing;
(c) drying the wet autoignition globule to render a dry autoignition globule which autoignites at about 190° to about 220° C.;
(d) placing a gas generating material within said housing; and
(e) sealing said housing.

17. The method of claim 16 wherein said autoignition composition comprises a chlorate selected from the group consisting of sodium chlorate, potassium chlorate, barium chlorate and mixtures thereof.

18. The method of claim 16 wherein said autoignition composition additionally comprises at least one element selected from water soluble binders and hydrophilic flow agent/thickeners.

19. The method of claim 18 wherein said wetautoignition composition comprises, based on percent weight:

| | |
|---|---|
| lead thiocyanate | 25–40% |
| potassium chlorate | 25–40% |
| water soluble binder | 0–5% |
| hydrophilic flow agent/thickener | 0–5% |
| water | 20–40%. |

20. A method of preventing, in a gas generation device for a vehicular passenger protection system, sufficient loss in mechanical strength of a gas generator housing prior to the ignition of the gas generating composition, said method comprising:
(a) providing a housing;
(b) providing at least one globule of an autoignition material adhering to the inside surface of said housing, said autoignition material comprising lead thiocyanate at a concentration of 25–50% by weight on a dry weight basis and chlorate; said autoignition material having a temperature of ignition of about 190° to about 220° C. which is lower than the temperature of ignition of said gas generating composition;
(c) providing a gas generating composition within said housing; and
(d) causing the autoignition material to ignite by means of an external heat source, said ignition of said autoignition material igniting said gas generating composition prior to said housing losing sufficient mechanical strength to cause breakage thereof.

* * * * *